United States Patent [19]

Thorn et al.

[11] Patent Number: 4,857,367
[45] Date of Patent: Aug. 15, 1989

[54] METHOD OF AND APPARATUS FOR SPRAYING

[76] Inventors: Brent A. Thorn, 37285 Little Mack, Mt. Clemens, Mich. 48043; William Hill, Clio, Mich.

[21] Appl. No.: 109,817

[22] Filed: Oct. 16, 1987

[51] Int. Cl.⁴ .............................................. B05D 1/02
[52] U.S. Cl. ..................... 427/348; 427/421; 118/63; 118/323; 118/326; 239/104; 239/124; 239/295
[58] Field of Search .................. 118/323, 326, 63; 239/104, 295, 124; 427/348, 421

[56] References Cited

U.S. PATENT DOCUMENTS

| | | | |
|---|---|---|---|
| 3,385,522 | 5/1968 | Kock | 239/124 X |
| 3,606,158 | 9/1971 | Pritchard | 239/124 |
| 4,262,036 | 4/1981 | Mineyama et al. | 118/323 X |
| 4,517,917 | 5/1985 | Santefort | 118/669 X |
| 4,723,710 | 2/1988 | Lacore | 239/124 |

FOREIGN PATENT DOCUMENTS 642016 1/1979 U.S.S.R. ........................ 118/63

Primary Examiner—Shrive Beck
Attorney, Agent, or Firm—Ralph M. Burton

[57] ABSTRACT

A method and apparatus for spray-coating the marginal area of a surface includes an air nozzle movable with the spray head for directing an air curtain against the surface spaced from the edge to limit coating spray from the head to a determined marginal area and vacuum means disposed adjacent the edge of the surface and movable with the air nozzle means for withdrawing airborne coating particles from the spray area at the side opposite the air curtain.

5 Claims, 4 Drawing Sheets

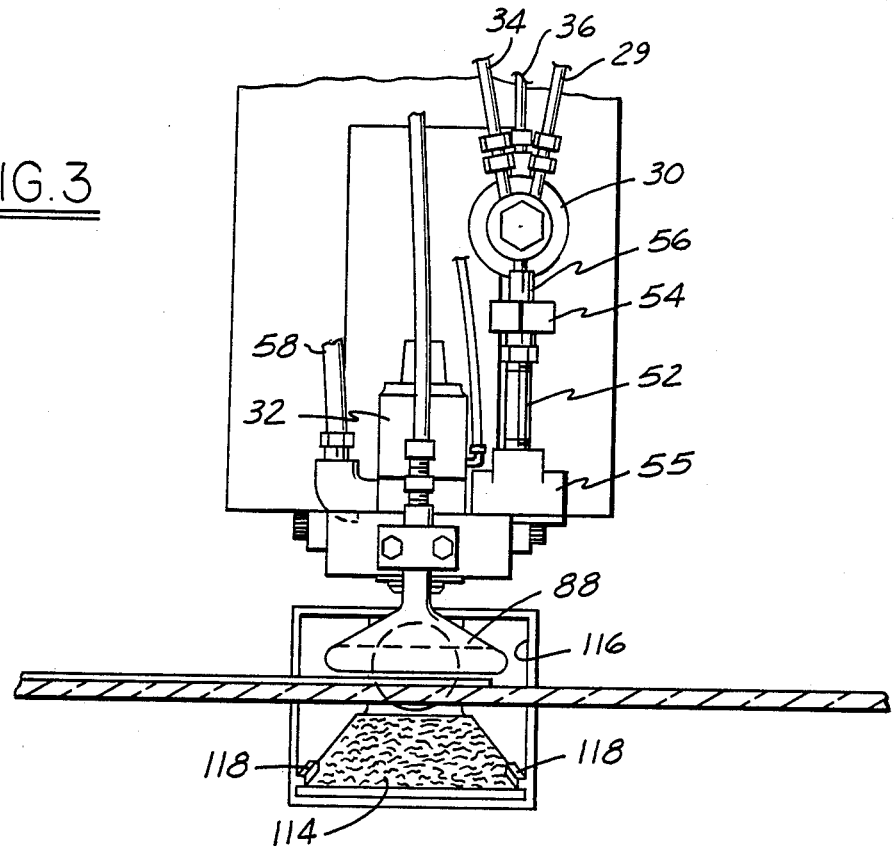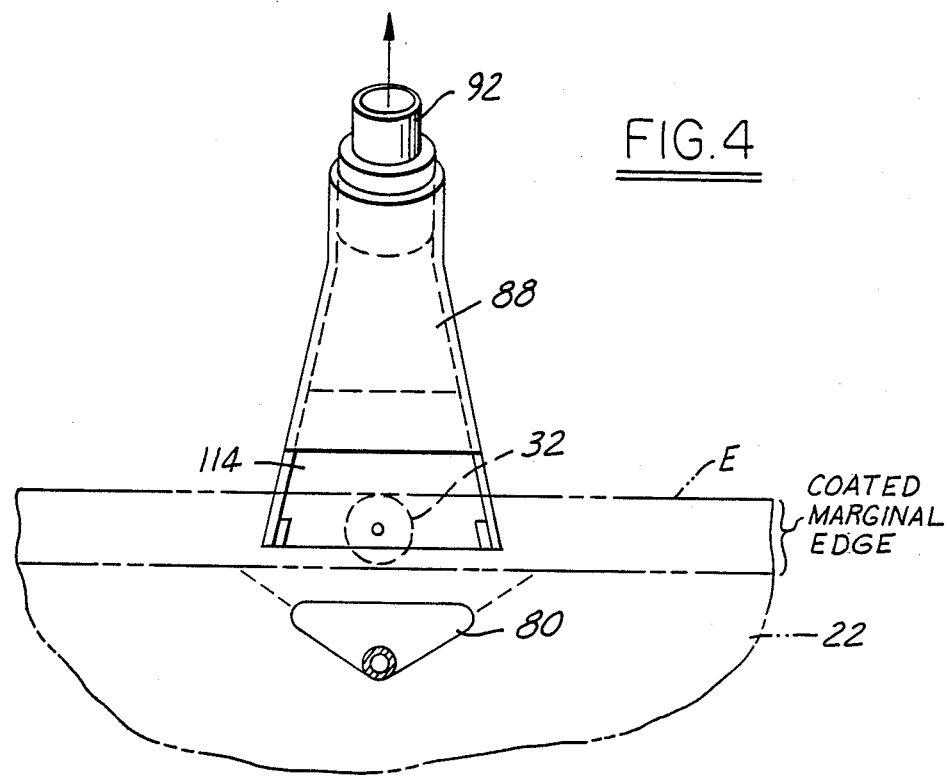

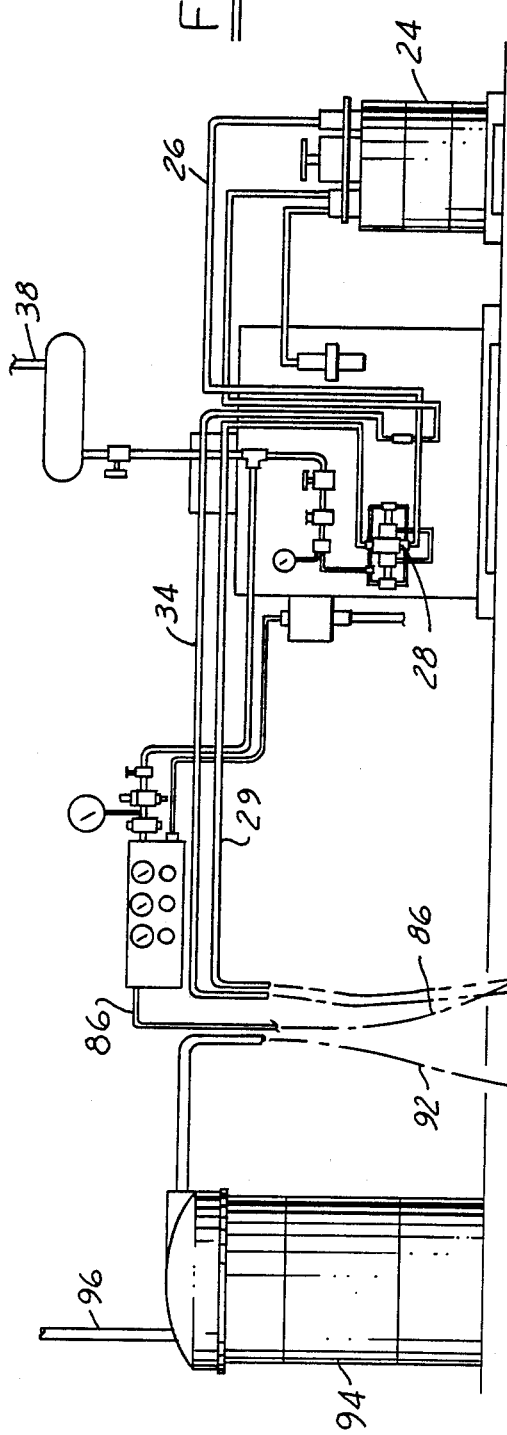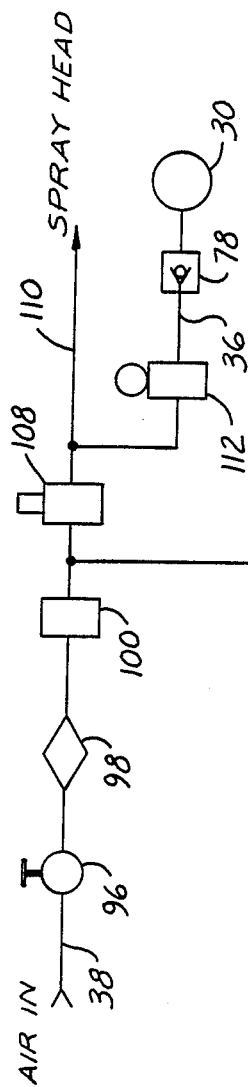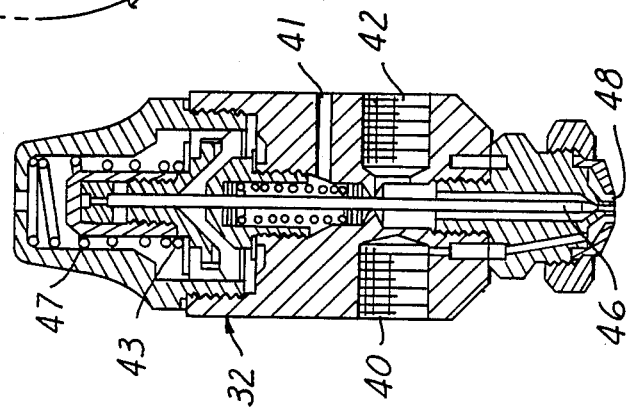

METHOD OF AND APPARATUS FOR SPRAYING

This invention relates to a method of and apparatus for spraying materials which must be recirculated to the source during the spraying operation.

BBACKGROUND OF THE INVENTION

In the preparation of windshields and backlights for installation in automobile bodies, it has become desirable to spray the marginal edge of the window glass with a primer. A primer found suitable for this purpose requires continuous recirculation from the source of the primer through the spray system to prevent the primer from setting up. Heretofore, no satisfactory system has existed for simultaneously recirculating the primer and spraying it onto the marginal edge of the window.

SUMMARY OF THE INVENTION

The system herein disclosed recirculates the primer to be sprayed at a relatively high rate from the source thereof through a pneumatically controlled recirculating valve which permits primer to feed from the recirculating system to the spray head in accordance with the pneumatic pressure applied to the valve. An air curtain associated with the spray head impinges on the glass spaced from the edge thereof to prevent overspray from drifting onto the glass. An aspirator nozzle disposed beyond the edge of the glass induces a flow from the air curtain into the nozzle whereby overspray is carried into the aspirator. Desirably the spray head, air curtain and aspirator nozzle are mounted on a robot which moves them linearly along the marginal edge of the glass to be coated.

DESCRIPTION OF THE DRAWINGS

FIG. 3 is a front elevational view taken in the direction of arrow 3 of FIG. 2;

FIG. 4 is a cross-sectional view taken on the line 4—4 of FIG. 2;

FIG. 6 showing the valve closed and FIG. 7 showing it open;

FIG. 8 is a front elevation of a spray system embodying the invention;

FIG. 9 is a schematic diagram of the spray system of FIG. 8; and

FIG. 10 is a cross-sectional view through a spray head useful in the invention.

DESCRIPTION OF PREFERRED EMBODIMENTS

Figure 1:
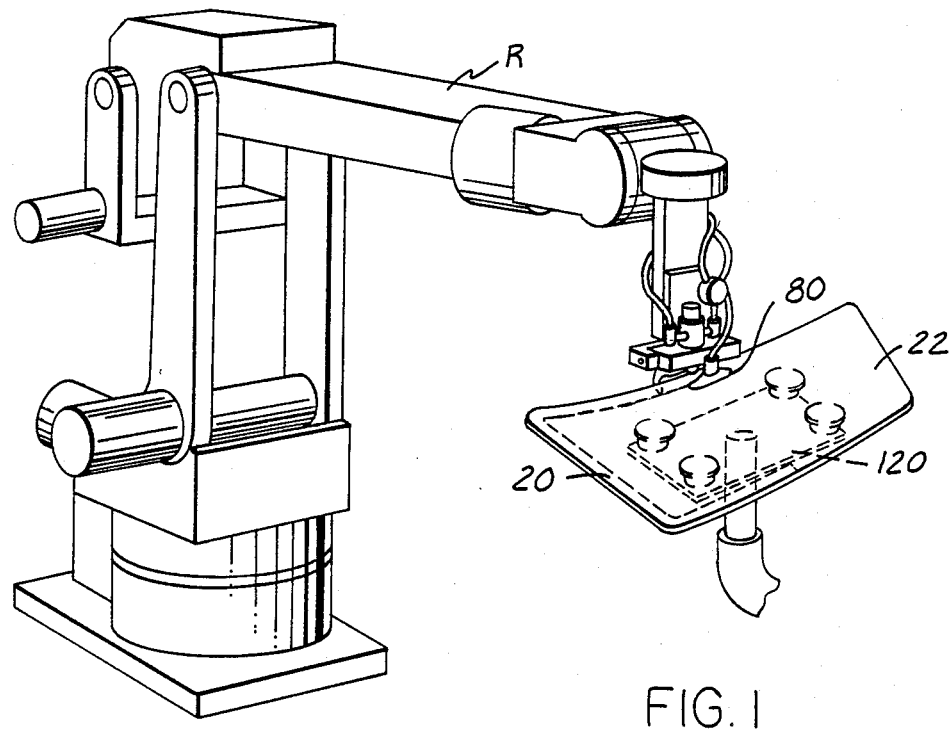
FIG. 1 shows a robot supported spray head, air curtain nozzle and aspirator nozzle for movement around the marginal edge of a vehicle window glass.

The method and apparatus disclosed herein is intended to spray coat the marginal edge 20 of an automotive window 22 by drawing the coating material from a source 24 (see FIG. 8) recirculating it through the system and spraying it on the marginal edge of the window glass utilizing a robot or the like R. Material to be sprayed is withdrawn from a container 24 thereof through the line 26 by a pump 28 and from thence is delivered by the line 29 to the pneumatically operated recirculating flow control valve 30 (see FIG. 2) disposed adjacent the spray head 32. Material entering the recirculating valve 30 returns to the container 24 through the return line 34. Control of valve 30 is effected through a pneumatic system including an air pressure line 36.

The system shown herein as been designed to spray what is termed a black primer number 435.34 manufactured by Essex Specialty Products, Inc., 1 Crossman Road South, Sayreville, N.J. 08872. Prior to this primer being applied to the glass, this glass is etched, using a suitable etching agent. The etching solution is applied to the glass as by a brush and then is wiped off and the glass is ready for the primer. Following application of the primer, the glass may be coated with a urethane adhesive for securement of the glass in the automobile body.

The pump 28 is of the diaphragm type such as manufactured by Aro Manufacturing Co. Air under pressure is delivered to the system from a source of plant air as at 38.

Spray head 32, useable with some modification, is available from Spraying System Co. as model ¼ JAU. A cross-sectional view is shown in FIG. 10. It is substantially of conventional construction having a material delivery port 40 through which the material to be sprayed is delivered to the head. Atomizing air is delivered to the spray port 42 through air line 58 and serves to atomize the primer as it discharges through the nozzle 48 as at 50 in FIG. 2. The spray head 32 operates in conventional fashion, i.e. upon application of actuating air through port 41 which shifts piston 43 connected to the needle valve 46, the needle valve is retracted to open the nozzle and permit the primer to discharge from the same. The atomizing air breaks up the pressure into a spray which is directed against the marginal edge of the window as shown at 50 in FIG. 2. Upon interruption of delivery of air to the port 41 the needle 46 is promptly closed by spring 47 thereby blocking further escape of the primer from the nozzle. Some reworking of the needle and port at the nozzle may be required depending upon the viscosity and character of the primer to be sprayed.

Primer delivered to port 40 is taken from the recirculating valve 30 by way of a short conduit section 56, thence through a union coupling 54 and finally a short length of conduit 52 and then through a Tee 55 from which it enters the vavle 32 through the part 40. In the event of the primer setting up between the recirculating valve and the spray head, the parts may be readily disassembled for cleaning.

Figure 5:
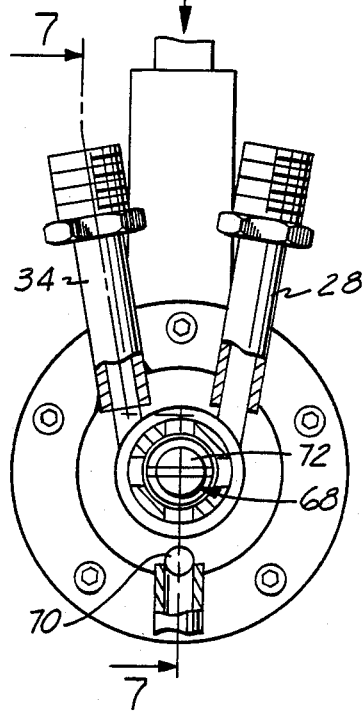
FIG. 5 is a cross-sectional view taken on the line 5—5 of FIG. 6 through the pneumatically operated recirculating flow control valve.
Figure 6:
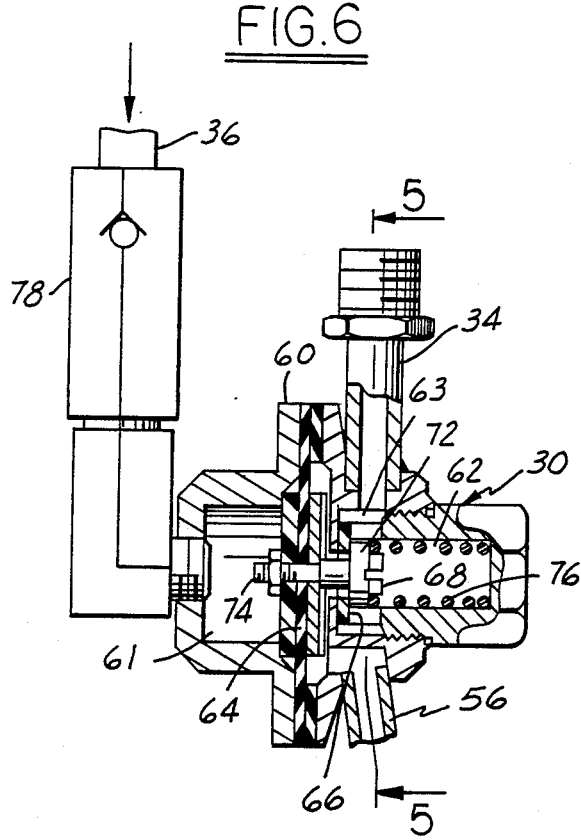
FIGS. 6 and 7 are cross-sectional views through the valve of FIG. 5 taken substantially on the line 7—7 of FIG. 5.
Figure 7:
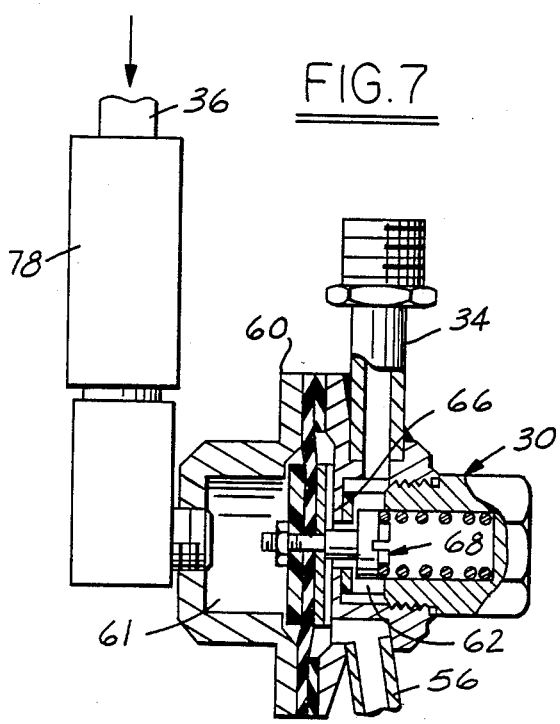

The pneumatically controlled recirculating valve 30 is best shown in FIGS. 5-7. It includes a valve body 60 having a pair of valve chambers 61 and 62 therein separated by a fluid pressure actuator diaphragm mechanism 64. Chamber 61 is exposed to one side of the diaphragm and communicates with the source of control air pressure through line 36. The chamber 62 is exposed to the other side of the diaphragm and communicates with the primer lines 29 and 34 through suitable ports, typified by port 63 in FIG. 6, whereby primer delivered to the valve through line 29 circulates through chamber 62 and then flows back to the source through line 34. The valve chamber 62 is also provided with a valve seat 66 and cooperating valve element 68 controlling the escape of primer from valve chamber 62 to port 70 and thence into conduit section 56 for delivery to the spray head.

The valve element 68 has a head portion 72 which overlies the seat 66 and blocks the escape of primer therethrough as shown in FIG. 6. The valve element has a stem portion 74 secured to the diaphragm. Bias means in the form of a compression spring 76 bears against the valve element and urges it against the seat 66 preventing escape of primer into conduit 56 to the spray head.

Chamber 61 communicates with pneumatic control line 36 through a one-way check valve schematically shown at 78 which prevents primer flow into line 36 in the event of diaphragm rupture. Upon pressurization of chamber 61 by the line 36, the diaphragm is shifted against the bias of spring 76 to unseat valve elements 72 and allow escape of primer to the spray head. The greater the pressure of air supply to chamber 61 the farther the diaphragm is moved and the more the valve is opened whereby the greater amount of primer delivered to the spray head. Thus the valve will deliver primer from the recirculating supply in accordance with the pressure of the air supply to chamber 61. This permits the operator to vary the volume of primer sprayed simply by varying the pressure in line 36. When pressurization of chamber 61 drops below the force of spring 76, primer delivery to the spray head is interrupted.

FIG. 7 illustrates the relationship of parts when check valve 61 is pressurized to open the valve and in this case primer entering through line 28 will not only recirculate out through line 34 but a portion will escape through conduit section 56 to the spray head.

Figure 2:
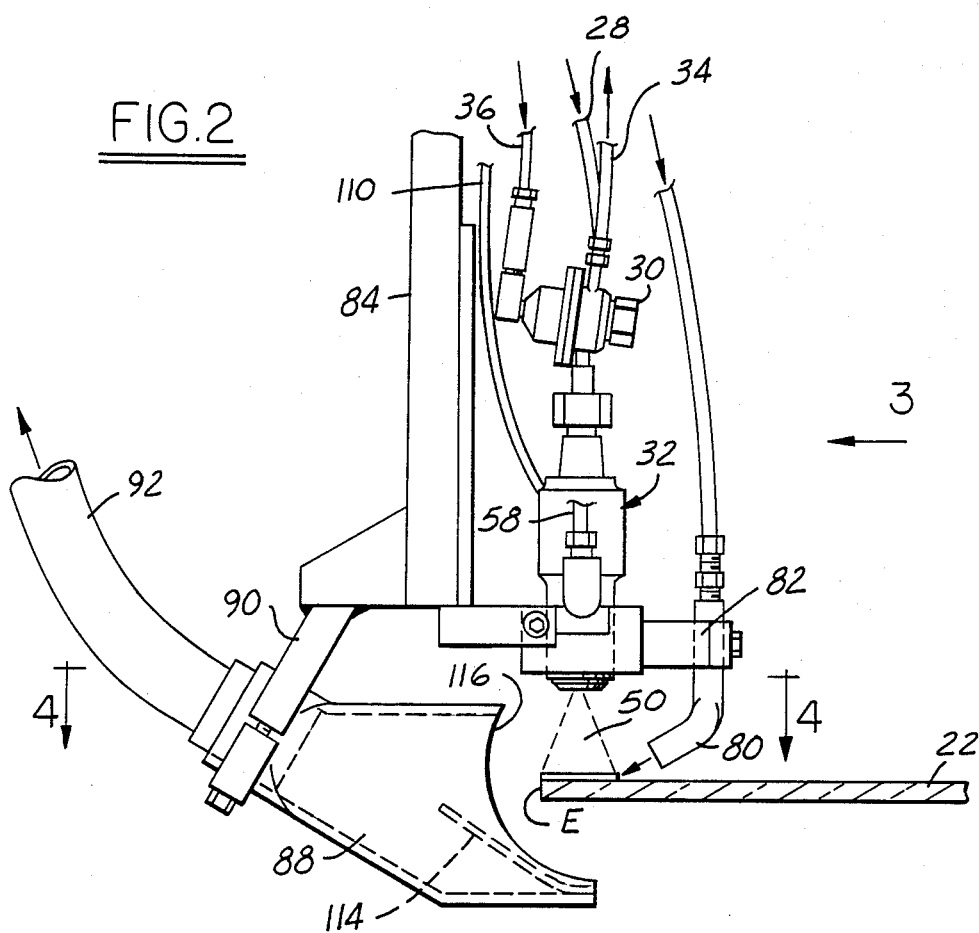
FIG. 2 is a side elevation of the spray head, air curtain nozzle and aspirator nozzle showing the relationship thereof during coating of the marginal edge of a window glass.

The primer applied to the marginal edge of the glass 22 is limited to a defined area as best shown in FIG. 4. This defined area is limited by the cooperation of an air curtain and an aspirator. The air curtain is disposed on the opposite side of the spray head 32 and its spray pattern 50 from the edge E of the glass. The air curtain is supplied by an air nozzle 80 disposed in laterally spaced relation from the spray head as best shown in FIG. 2. The air nozzle may be carried by a bracket 82 mounted on the robot arm 84. The bracket may also support the spray head 32.

The air nozzle 80 is fed with air under pressure by line 86. The nozzle is directed toward the glass surface to impinge thereon along a line marking the limit of the marginal area to be coated. As shown in FIG. 1 the air nozzle is elongated in the direction of spray head travel to discharge an air curtain having a linear dimension paralleling the movement of the spray head. The air curtain is not only directed toward the glass surface but is also directed diagonally across the surface toward the edge E. Just outboard of such edge an aspirator hood or scoop 88 is provided supported on the robot arm 84 by a bracket 90. A suction line 92 connects the hood 88 to a vacuum collector 94 for collecting air borne primer spray particles. A vacuum line 96 serves to impose a partial vacuum on the collector.

The hood cooperates with the air nozzle to establish an air flow across the marginal edge of the glass and the spray 50 from the head 32 is directed through this air flow. Primer particles which do not adhere to the glass are thereby immediately entrained in this air flow and are swept into the hood 88 and from thence carried to the collector 94. As a result, overspray onto the glass is prevented and the primer coating is confined to a well defined marginal area.

FIG. 9 schematically shows the control air circuit of the apperatus. Plant air is delivered as at 38 and passes through a shut off valve 96, a filter 98 and thence to a pressure regulator 100 which, for example, limits the air pressure to 50 psi. Down stream of this regulator air passes to a solenoid operated control valve 102 and from thence to two regulators 104 and 106, each of which may be adjusted to provide a relatively low air pressure, for example about 7 psi. One regulator delivers this air pressure by line 58 to the primer spray head to provide the atomizing air for the head. This relatively low pressure has been found desirable in preventing undesired overspray problems. From regulator 106, also at about 7 psi, air is delivered to the air curtain nozzle 80 by the line 86. Thus it will be noted that when solenoid valve 102 is energized the air curtain is established and the atomizing air is delivered to the spray head 32.

Air pressure from regulator 100 is also delivered to solenoid valve 108 and from thence by line 110 to the spray head port 41 for shifting the needle valve. This air pressure would be on the order of 50 psi. Air from the regulator 108 is also delivered to a pressure regulator 112 where the pressure is reduced to from 5 to 7 psi and is delivered by line 36 through the one way check valve 78 and thence to the primer recirculating and flow control valve 30.

In operation of the system, solenoid valve 102 is energized approximately one second before solenoid valve 108 is energized so that the air curtain and atomizing air are established at the spray head before the primer is delivered. Suitable timing means of conventional construction may be utilized for this purpose.

At the aspirating hood or scoop 88, a replaceable primer deflector 114 is provided. This deflector is positioned in the mouth 116 of the hood to direct inflowing air into the duct 92 so that air borne primer particles entering the hood will tend to collect on the deflector rather than on the other interior surfaces of the hood. The hood may be provided with retaining shoulders or tabs 118 beneath which the deflector is disposed and retained. The deflector may be changed conveniently at the change in labor shifts during the work day.

The deflector is preferably formed of an inexpensive material such as moisture resistant cardboard or the like. Shown in FIG. 1 the robot R will serve to move the spray head air curtain and aspirator scoop linearly along the marginal edge of the glass 22 so that the margin is coated with the primer. Control means, not shown, will signal the robot when the glass 22 is in proper position so that the sequence of coating operation may be commenced. The glass may be conveniently supported on a vacuum support schematically indicated at 120. In a typical installation the robot will move the spray head at the rate of substantially 13 inches per second around the periphery of the glass 22.

Thus we have disclosed a method and apparatus for spray coating the marginal edge of a surface such as an automotive windshield or backlight and wherein a remotely, pneumaticaly controlled, recirculating flow control valve may be operated to deliver a portion of the material circulating therethrough to a spray head. An air curtain disposed adjacent the head and on that side opposite the edge of the surface being coated, limits the outer boundary of the spray coating. An aspirator disposed outwardly adjacent the edge of the surface cooperates with the air curtain to remove overspray.

We claim:

1. A method of coating a defined marginal area of a surface comprising the steps of:
    establishing an air curtain impinging on the surface spaced from the edge by the width of the marginal area to be coated;
    creating a partial vacuum outwardly of the edge of the surface to be coated to establish an air flow across the area to be coated from the curtain toward the vacuum; and
    spraying the coating through said air flow and entraining overspray therein while moving the spray, air curtain and partial vacuum linearly along the edge of the surface.

2. A system for spray coating the marginal edge of a surface comprising, in combination:
    a spray head supported for movement linearly relative to the marginal edge for spray coating the marginal edge of the surface;
    air nozzle means mounted for movement with the spray head and disposed on that side thereof opposite the edge of the surface for directing an air curtain against such surface to define the outer limit of the marginal area to be coated; and
    vacuum means mounted for movement with the spray head and disposed adjacent the edge of the surface to be coated and on the opposite side of the spray head from the air nozzle means for withdrawing airbone coating particles from the spray area at the side opposite the air curtain.

3. In a system for spray coating a defined marginal edge of a surface wherein a spray head for the coating is positioned adjacent the surface to be coated and the head and surface are moved linearly relative to each other to lay down a spray coating on the marginal edge of the surface, the invention characterized by:
    air nozzle means disposed adjacent the surface to be coated and spaced laterally from the spray head and movable relative to the surface to be coated with the spray head for delivering and directing an air curtain against such surface spaced from the edge of the surface to limit coating spray from the spray head to a determined marginal area of the surface; and
    vacuum means disposed adjacent the edge of the surface to be coated on the opposite side of the spray head from the air nozzle means and movable relative to the surface to be coated with the air nozzle means for withdrawing airborne coating particles from the spray area at the side opposite the air curtain.

4. The invention defined by claim 3 wherein said vacuum means inlcudes an aspirator nozzle for collecting airborne coating particles; and a replaceable deflector in the nozzle positioned to direct inflowing air into a duct system connected to the nozzle and arranged to be struck by airborne coating particles entering the aspirator nozzle.

5. The invention defined by claim 4 wherein said deflector is cardboard.

* * * * *